United States Patent
Pfister et al.

[19]

[11] Patent Number: 6,059,163

[45] Date of Patent: May 9, 2000

[54] SETTING TOOL

[75] Inventors: Norbert Pfister, Montlingen, Switzerland; Markus Frommelt, Schaan, Liechtenstein; Gerhard Ehmig, Rankweil; Tilo Dittrich, Gisingen, both of Austria

[73] Assignee: Hilti Aktiengesellschaft, Schaan, Liechtenstein

[21] Appl. No.: 09/376,691

[22] Filed: Aug. 18, 1999

Related U.S. Application Data

[62] Division of application No. 09/084,857, May 26, 1998, abandoned.

[30]     Foreign Application Priority Data

May 30, 1997 [DE] Germany ................ 197 22 795

[51] Int. Cl.[7] ............................................... B25C 1/14
[52] U.S. Cl. ................................. 227/10; 173/211
[58] Field of Search ..................... 227/9, 10, 11; 173/210, 211

[56]     References Cited

U.S. PATENT DOCUMENTS

| | | | |
|---|---|---|---|
| 3,632,032 | 1/1972 | Termet | 227/10 |
| 3,690,536 | 9/1972 | Bakoledis | 227/10 |
| 4,122,987 | 10/1978 | Jochum et al. | 227/10 |
| 5,239,829 | 8/1993 | Blake | 227/10 |

*Primary Examiner*—Scott A. Smith
*Attorney, Agent, or Firm*—Brown & Wood, LLP

[57]     ABSTRACT

A high pressure gas-operated setting tool, and including a driving piston (21, 41, 61, 81) displaceable in a piston guide (7, 27, 47, 67) and having a stem (8, 28, 48, 68) and a head (9, 29, 49, 69), and a return member surrounding the stem (8, 28, 48, 68) and arranged between a stop (17), provided on the piston guide (7, 27, 47, 67) and facing in a direction opposite to a setting direction, and a front, in the setting direction, end face (18, 38, 58, 78) of the head (9, 29, 49, 69), with the return member being formed as a hollow cylindrical structural member of an elastic material and having a plurality of openings (12, 32, 34, 52, 72) which alternate, in a longitudinal direction, with layers of the elastic material.

3 Claims, 7 Drawing Sheets

SETTING TOOL

RELATED APPLICATIONS

This application is a division of application Ser. No. 09/084,857 filed May 26, 1998, now abandoned.

BACKGROUND OF THE INVENTION

1. Field of the Invention

The present invention relates to a high pressure gas-operated setting tool including a piston guide, a driving piston displaceable in the piston guide and having a stem and a head, and a return member surrounding the stem and arranged between a stop, which is provided on the piston guide and faces in a direction opposite to a setting direction, and a front, in the setting direction, end face of the head.

2. Background of the Invention

For driving nail-shaped attachment members in hard structural components formed of cement, rock, steel and the like, high pressure gas-operated setting tools are used. In the preferred type of such setting tools, which are presently widely used, and from the safety point of view, the high pressure gas acts on a driving piston which acts on the driven attachment members. While those tools have certain advantages, on one hand, they also have a drawback, on the other hand, which consists in that after each driving-in cycle, the driving piston need be returned into its initial position. Because of this, for many years, return members for the driving pistons have been used. German publication DE-OS1 939 801 discloses an explosive powder charge-operated setting tool in which the driving piston is returned in its initial position after each driving-in cycle with a return member. The return member is formed as an elastic sleeve surrounding the piston stem and extending between a stop, provided on the piston guide and facing in a direction opposite to the setting direction, and a front, in the setting direction, end face of the piston head.

Figure 1:
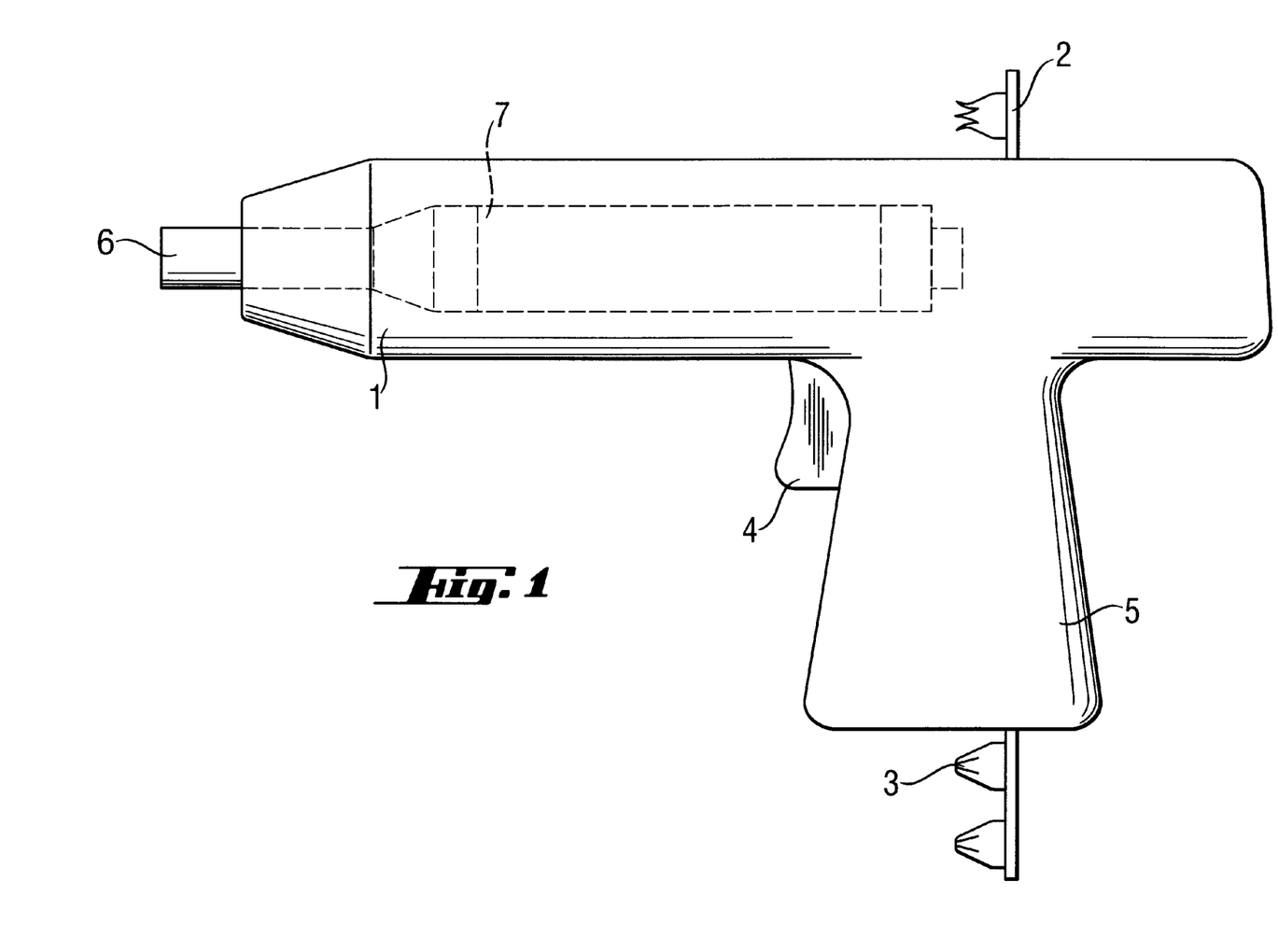
FIG. 1 shows a side view of a simplified version of a setting tool according to the present invention.

The elastic sleeve is surrounded by a hollow cylindrical free space so that the sleeve can expand radially when it is axially compressed. When the sleeve is compressed, the sleeve material becomes also compressed. This results in a substantial heat generation which leads to a premature changes in and to a high wear of the material. When the free space is used up, i.e., when the sleeve cannot expand radially any more, a further axial compression of the sleeve becomes impossible. The sleeve, which is disclosed in DE-OS 1 939 801 and is shown in FIG. 1 of this publication, at most, can be compressed to a length corresponding to about 800 of the original length of the return member. This small axial displacement of the drive piston is particularly disadvantageous when nail-shaped attachment member having a substantial length must be driven into a structural component.

Accordingly, an object of the present invention is to provide a high pressure gas-operated setting tool the return element of which can be economically produced, which would insure an adequate return displacement of the drive piston in its initial position after each driving-in cycle, which would have a small weight, and which would be compressible to more than half of its initial length.

SUMMARY OF THE INVENTION

This and other objects of the present invention, which will become apparent hereinafter, are achieved by providing a setting tool of the above-described type in which the return member is formed as a hollow cylindrical structural member of an elastic material and has a plurality of openings which alternate, in a longitudinal direction of the structural member, with layers of the elastic material. The resilience of the structural member is achieved by the flexion of regions of the structural member. The compression of the material with the accompanying it drawbacks does not take place in the structural member according to the present invention. The structural member has a large spring travel path corresponding to a length equal from about 25% to 50% of the initial length. During the compression of the structural member, the size of the openings in the longitudinal direction is reduced. Therefore, the length of the compressed structural member can correspond essentially to the sum of width of the elastic material layers measured in longitudinal direction. A structural member with a high degree of deformation is advantageously achieved when the openings are formed as through—holes extending in a direction transverse to the longitudinal direction. The cross-section of the through-holes can be, e.g., in a form of an equilateral quadrangle, particular, a rhomb or a square, and also in a form of a circle or an ellipse. If the openings are formed as rhombs, one of the diagonals can extend parallel to the setting direction. When the openings have a square cross-section, one side of the opening can extend substantially parallel to the setting direction. The through-holes can be so arranged in the structural member that each two through-holes, arranged one after another in the longitudinal direction of the structural member, are offset relative to each other in a circumferential direction by approximately a half of the inner width of a through-hole measured transverse to the longitudinal direction of the structural member.

Advantageously, the openings are formed as circumferential indentations provided, in the longitudinal direction, alternatively on the inner side and the outer side of the structural member. This advantageously formed structural member, like a rubber sealing collar, has a very large spring travel path. The deformation of the structural member is effected without buckling of the elastic material. Therefore, the structural member can be compressed until surfaces, which border the openings, abut each other. The openings can extend transverse to or be inclined in the longitudinal direction of the structural member, and the wall thickness of the structural member can be smaller at the deepest point of the indentation than in the region of the surfaces of the structural member which limit the indentations. At least one of the circumferential indentations, which are provided on the outer and/or inner sides of the structural component, can cooperate with a guide disc which, on one hand, projects into the indentation and, on the other hand, is sidewisely supported on the stem of the driving piston or the inner wall of the guide tube. At both ends, the structural member can cooperate with pressure discs, which in addition to damping properties, also have insulation properties, so that the heat, generated in the region of the driving piston head, would not directly be transmitted to the structural member.

A large biasing force, which acts in the longitudinal direction of the structural member, is advantageously achieved when the circumferential indentations extend along a helical line.

For increasing the return force, which is provided by the structural member, the structural member cooperates with at least one helical spring which advantageously is located in the indentation of the structural member. The helical spring can be located in the indentation provided either in the outer side or in the inner side of the structural member. Also, two helical springs can cooperate with the structural member, with the two springs being located, respectively, in the indentations provided on the inner and outer sides of the structural member. The cross-section of the wire, from which the helical compression spring is formed, can be circular, elliptic, rectangular or square.

A structural member, the openings of which are defined by a circumferential, closed hollow chamber formed in the elastic material, has a particularly large biasing force. The structural member can, e.g., have a plurality of, arranged one after another in the longitudinal direction of the structural member, circular hollow chambers which are spaced from each other. Alternatively, the structural member can have, preferably, only one circumferential chamber formed as a helix extending along the structural member.

Setting tools having piston guides of different length require structural members which likewise have different length. In order to be able to adapt, during the assembly, the length of the structural member to the length of the piston guide, without using an auxiliary tool and quickly, the structural member is advantageously formed of a plurality of separate elastic elements arranged axially one after another. Each separate elastic element has a length corresponding to a portion of the entire length of the structural member and is resiliently deformable. The deformation of a separate elastic element is effected until it flatly abuts a flat circular disc. The separate elastic elements can be formed, e.g., as a bulged disc or as a plate spring.

A form-locking interengagement of separate elastic elements in the longitudinal direction and any obstacles to the deformation of the separate elastic elements, upon application an axial load, are eliminated, e.g., by providing support discs, with at least one disc being arranged between two adjacent separate elastic elements. The separate elastic elements can be formed of a plastic material, rubber or a spring metal. Instead or in addition to the support discs, damping discs, which are formed of a muffling material, can be arranged between separate elastic elements formed, e.g., of a spring metal, in order to eliminate noise when the separate elastic elements are suddenly compressed.

The separate, axially arranged one after another, elastic elements, which form a pack, can be enveloped with a rubber, in particular when formed of a spring metal. The sheathing can also cover at least one surface of the separate plastic element, which extends parallel to the longitudinal direction of the structural member.

In order to achieve a good guidance of the separate elastic elements inside the piston guide and to prevent an undesirable interengagement of adjacent elements, at least one support disc is provided between the separate elastic elements. The support disc can be formed, e.g., of rubber, an elastomer, fiber reinforced plastics, steel or titanium. It has a central opening the diameter of which corresponds substantially to the diameter of the driving piston shaft. The outer diameter of the support disc corresponds substantially to the inner diameter of the piston guide. Advantageously, a separate elastic element and at least one elastic support disc are formed integrally with each other, which facilitates the assembly of the setting tool.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

A setting tool according to the present invention, which is schematically shown in FIG. 1, includes a housing 1, a handle 5 formed integrally with the housing 1, and a strip-shaped cartridge clip 2 with a plurality of cartridges 3, which extends through the handle 5. In the transitional region between the housing 1 and the handle 5, a trigger 4 is arranged. The trigger 4 serves for an actuation of a firing mechanism, not shown. A bolt guide 6 projects beyond the front, in the setting direction, end of the housing 1. The bolt guide 6 and a piston guide 7, which adjoins the bolt guide 6 at its rear, in the setting direction end, are displaceable, in a direction opposite to the setting direction, to their operational position, not shown.

Figure 2:
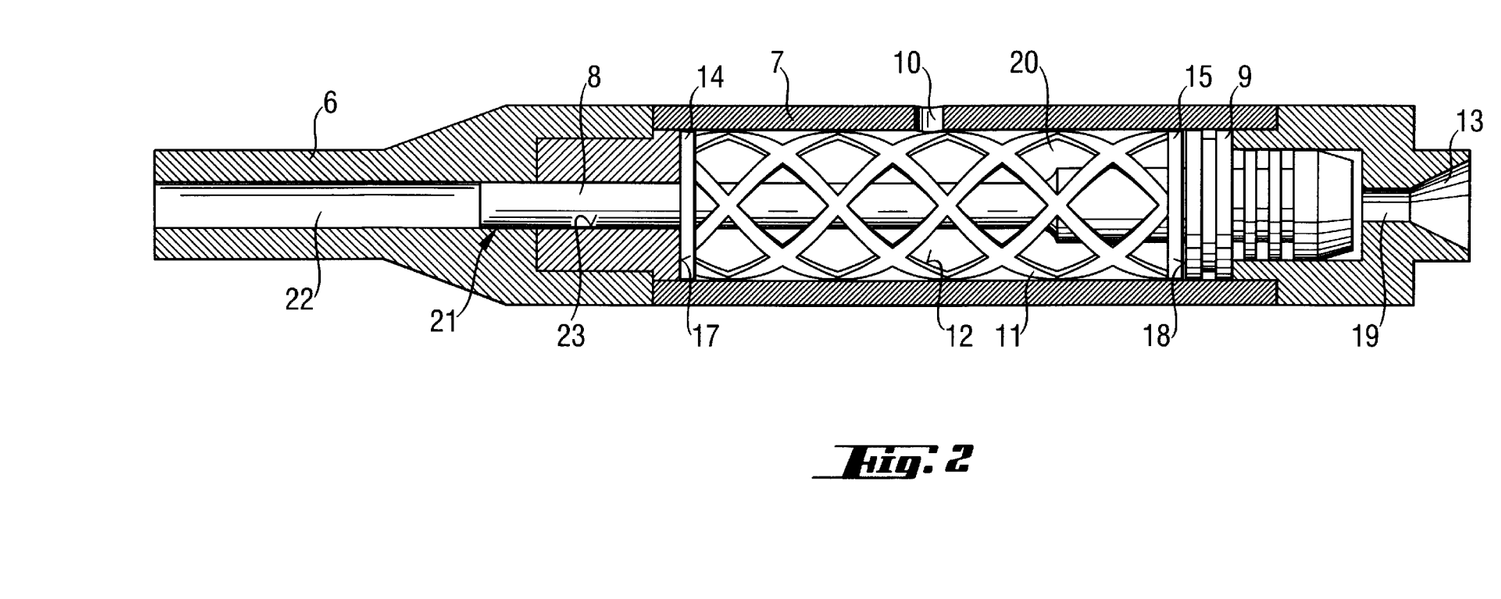
FIG. 2 shows a longitudinal cross-sectional view of the piston guide, the driving piston, and the structural member of the setting tool shown in FIG. 1, with the driving piston and the structural member of the setting tool shown in their initial positions.

In FIG. 2, a driving piston 21 is shown in its initial position. In this position, a stem 8 of the driving piston 21 does not extend beyond the front, in the setting direction, end face of the bolt guide 6. A structural member 11, the openings of which extend transverse to its longitudinal extent, is not axially loaded and is likewise shown in its initial position.

Figure 3:
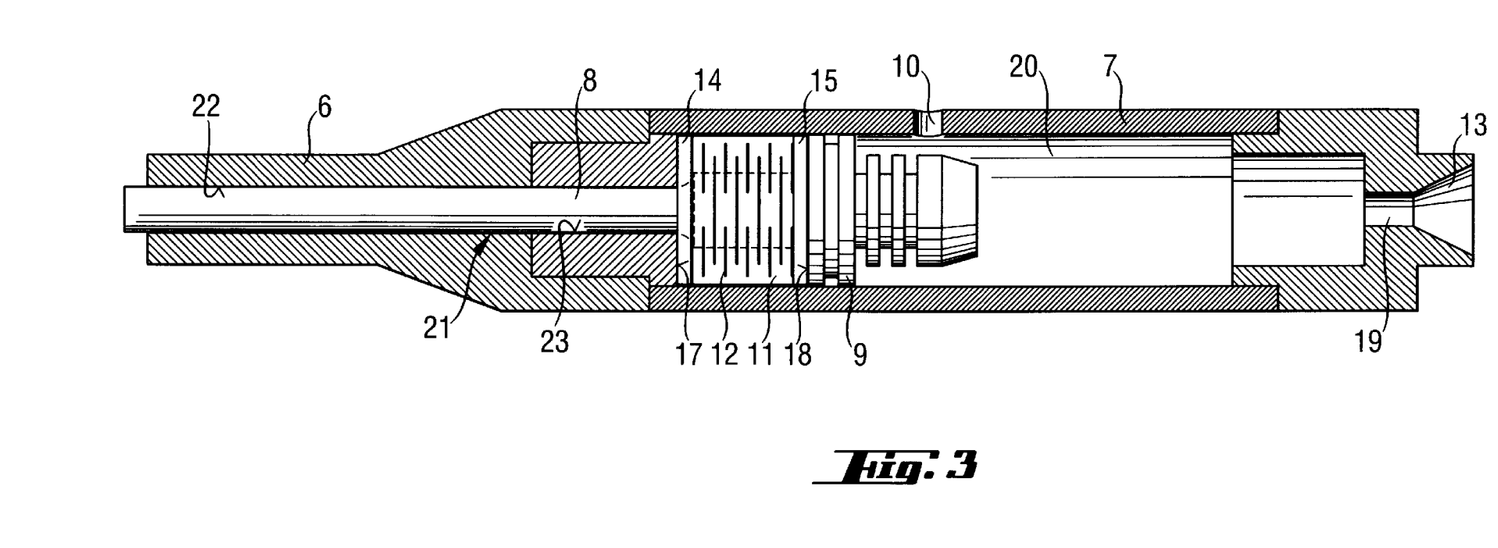
FIG. 3 shows a longitudinal cross-sectional view of the piston guide, the driving piston, and the structural member of the setting tool shown in FIG. 1, with the driving piston and the structural member shown in their operational positions.

FIG. 3 shows the driving piston 21 in its operational position. In this position, the stem 8 of the driving piston 21 projects beyond the front, in the setting direction, end face of the bolt guide 6, and the structural member is compressed to about 350-. of its initial length.

Piston guides 7, 27, 47, 67, which are shown in FIGS. 2 through 7, have each a central cylindrical guide bore 20, 40, 60, 80, respectively, which extends parallel to the longitudinal extend of the respective piston guide 7, 27, 47, 67. A cartridge chamber 13, 33, 53, 73 is provided in a rear, with respect to the setting direction, end region of the piston guide 7, 27, 47, 67 and is directly connected with respective guide bore 20, 40, 60, 80 by a respective connection channel 19, 39, 59, 79.

The drive piston 21, 41, 61, 81, which serves for driving an attachment member, not shown, in a structural component, likewise not shown, has a head 9, 29, 49, 69 and a stem 8, 28, 48, 68, with the outer diameter of the head 9, 29, 49, 69, which substantially corresponds to the inner diameter of the guide bore 20, 40, 60, 80, being larger than the diameter of the stem 8, 28, 48, 68.

The guide bore 20, 40, 60, 80 serves for guiding the head 9, 29, 49, 69 upon the axial displacement of the drive piston 21, 41, 61, 81. In its front, in the setting direction, region, the guide bore 20, 40, 60, 80 has a stop 17 formed as an annular surface. The stop 17 serves for supporting the head 9, 29, 49, 69 of the drive piston 21, 41, 611 81, with a return element, which is formed as a structural member 11, 31, 51, 71 provided between the stop 17 and the head 9, 29, 49, 69. In the region of the stop 17, the outer wall of the piston guide 7, 27, 47, 67 has an aeration bore 10, 30, 50, 70 which serves for aeration of the front, in the setting direction, portion of the guide bore 20, 40, 60, 80 when the driving piston 21, 41, 61, 81 is displaced, during a setting process, in the setting direction.

The stem 8, 28, 48, 68 of the drive piston 21, 41, 61, 81 is displaced in a central bore 23 of the piston guide toward the front, in the setting direction, end region. The central bore 23 extends between a central through—bore 22 of the bolt guide 6 and the central bore 20, 40, 60, 80 of the piston guide 7, 27, 47, 67. The diameter of the through—bore 22 corresponds substantially to the diameter of the central bore 23 of the piston guide 7, 27, 47, 67. The central bore 23 extends in a reduced diameter portion of the piston guide 7, 27, 47, 67 which is surrounded by a widened portion of the bolt guide 6.

Figure 4:
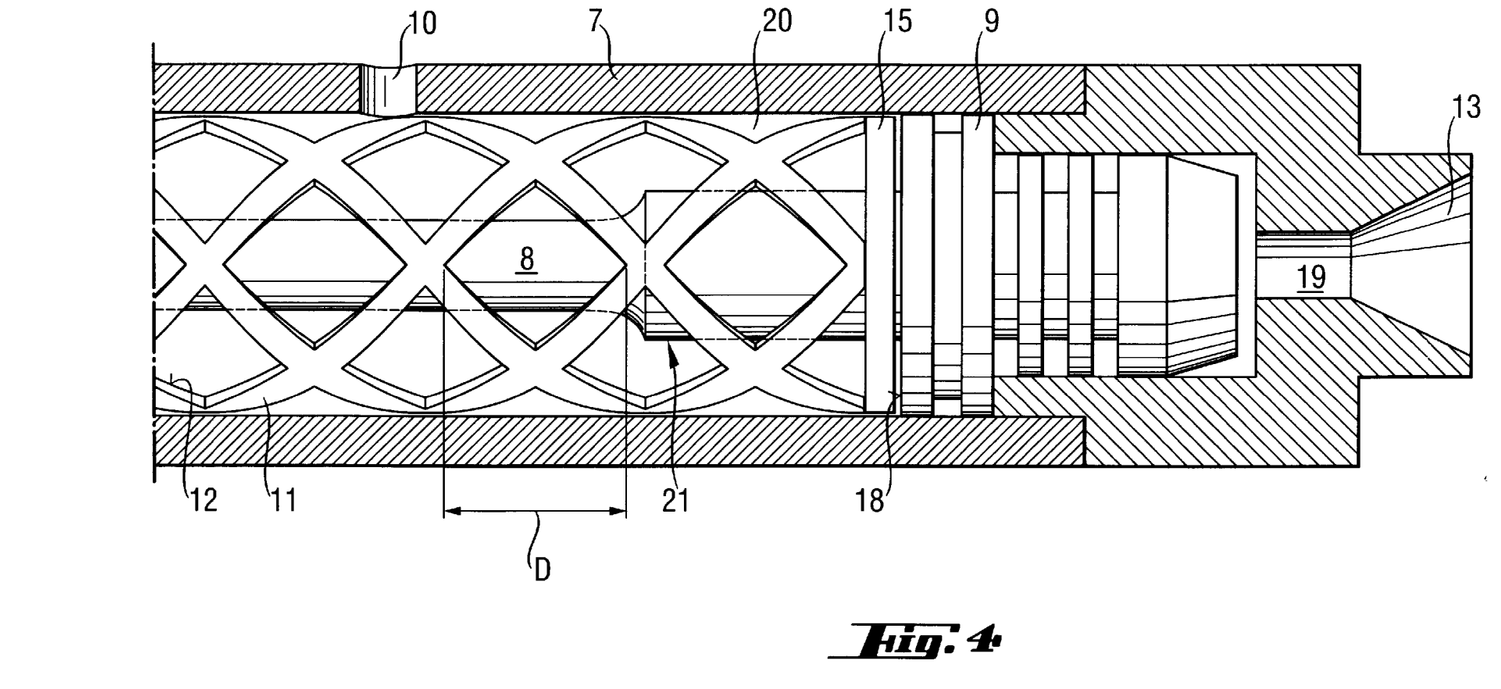
FIG. 4 shows a longitudinal cross-sectional view at an increased scale of a portion of the piston guide of the setting tool shown in FIG. 1.

In FIGS. 2 and 4, the drive piston 21, 41, 61, 81 is in its initial position. The structural member 11, 31, 51, 71 which serves for returning the drive piston 21, 41, 61, 81 into its initial position, surrounds a portion of the stem 8, 28, 48, 68 of the drive piston 21, 41, 61, 81, which is located between the end face of the head 9, 29, 49, 69, facing in the setting direction, and the stop 17 of piston guide 7, 27, 47, 67. The structural member 11, 31, 51, 71 cooperates form-lockingly with the pressure discs 14, 15, 35, 55, 75 provided on opposite sides of the structural member 11, 31, 51, 71. The outer diameter of the pressure discs 14, 15, 35, 55, 75 corresponds substantially to the inner diameter of the guide bore 20, 40, 60, 80, and the inner diameter of the pressure discs 14,15, 35, 55, 75 corresponds substantially to the diameter of the stem 8, 28, 48, 68 of the drive piston 21, 41, 61, 81.

The length of the structural member 11, 31, 51, 71 corresponds, in the initial position of the drive piston 21, 41, 61, 81, essentially to the distance between the stop 17 of the piston guide 7, 27, 47, 67 and the front, in the setting direction, end face 18, 38, 58, 78 of the head 9, 29, 49, 69 minus the width of the two pressure discs 14, 15, 35, 55, 75.

The structural members 11, 31, 51, 71, which are shown in FIGS. 2 through 7 and which serve as the return members, are formed as hollow cylindrical members of an elastic material with openings 12, 32, 34, 52, 72. Along the axial length of the structural member 11, 31, 51, 71, the openings 12, 32, 34, 52, 72 alternate with solid layers of the elastic material.

The construction of the structural member 11, 31, 57, 71 provides for a large spring travel path, and the structural member 11, 31, 51, 71 can be compressed from 25-. to 5011 of its original length. Upon compression of the structural member 111 31, 51, 71, the openings 12, 32, 34, 52, 72 are completely compressed in the longitudinal direction of the structural member 11, 31, 51, 71, with portions of the structural member 11, 31, 51, 71 being deformed by bending until separate layers of the elastic material abut each other. The length of the compressed structural member 11, 31, 51, 71 corresponds substantially to the sum of widths of all of the layers of the elastic material measured in the longitudinal direction of the structural member 11, 31, 57, 71.

The openings 12 of the structural member 11, which is shown in FIGS. 2 through 4, are formed as through-holes extending substantially transverse to the longitudinal direction. The through-holes have a shape of a equilateral quadrangle, e.g., a rhomb. One of the diagonals D of the through-holes extends substantially parallel to the setting direction. Every two through-holes, which are located one behind the other in the longitudinal direction, are offset relative to each other in a circumferential direction by an amount which substantially corresponds to a half of an inner width of the through-hole measured in a direction transverse to the longitudinal direction of the structural member 11. On elastic pressure disc 14 is provided between the stop 17 of the driving piston 21 and the structural member 11.

Figure 5:
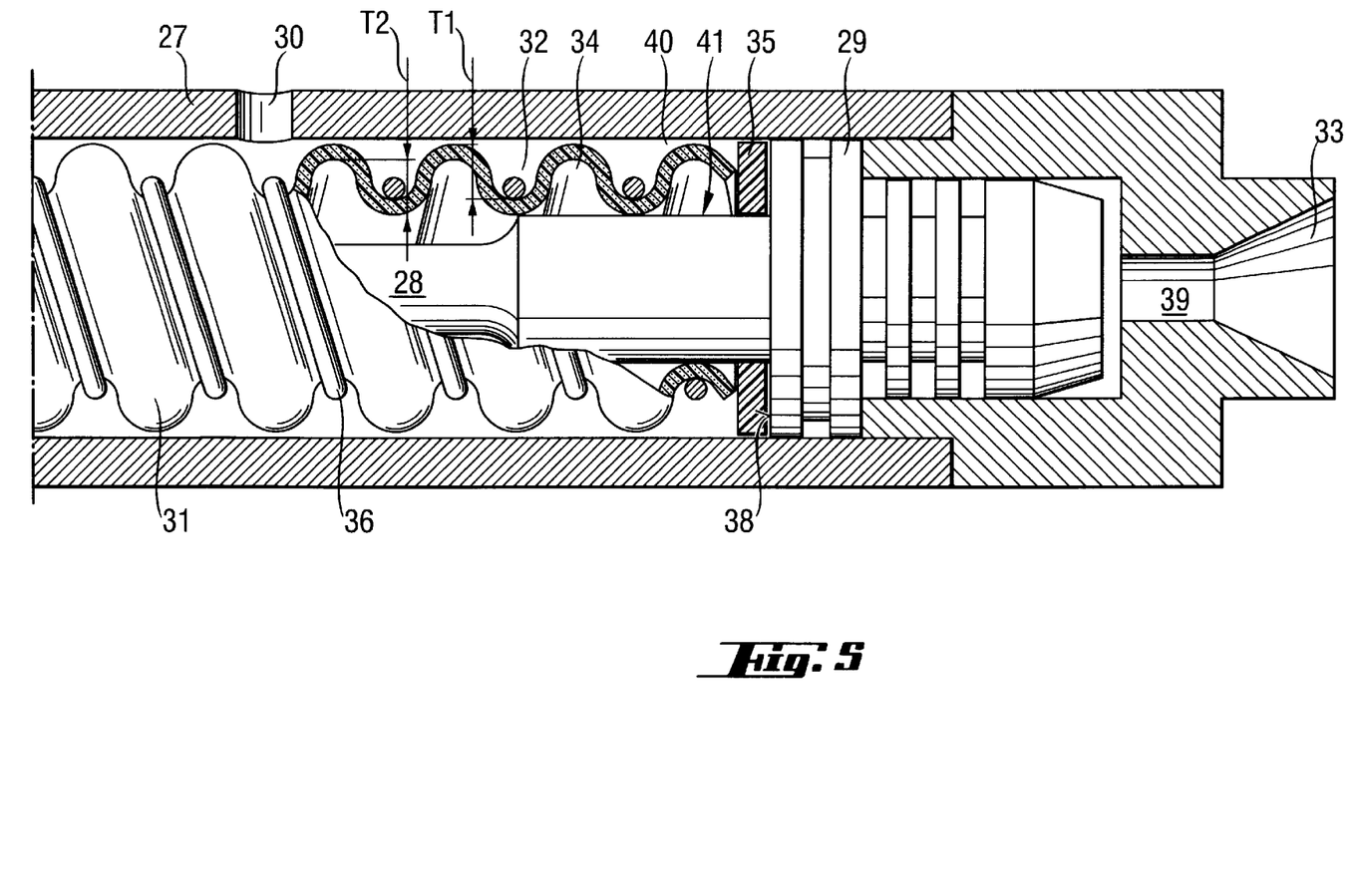
FIG. 5 shows a longitudinal cross-sectional view at an increased scale of a portion of piston guide of a setting tool according to the present invention, with a modified embodiment of the structural member according to the present invention.

Openings 32, 34 of a structural member 31, which is shown in FIG. 5 are formed by circumferential indentations T1, T2 which alternate in the longitudinal direction and are provided in inner and outer sides of the structural member 31. The indentations are inclined, along their longitudinal extent, in the longitudinal direction of the structural member 31. The structural member 31 cooperates with a helical compression spring 36 which has its coils located in the indentations formed on the outer side of the structural member 31. An elastic pressure disc 35 is located between the front, in the setting direction, end face 38 of the drive piston 41 and the structural member 31.

Figure 6:
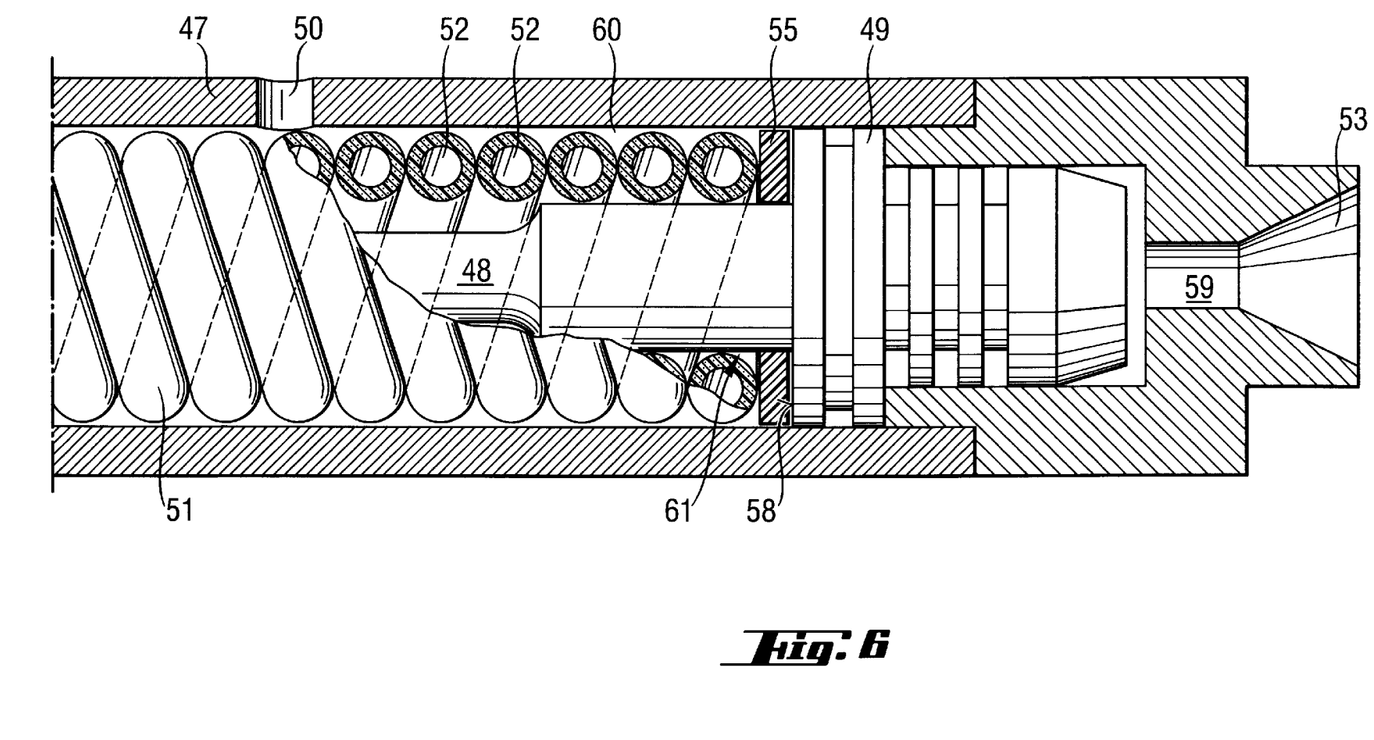
FIG. 6 shows a longitudinal cross-sectional view at an increased scale of a portion of a piston guide of a setting tool according to the present invention, with a further embodiment of a structural member according to the invention.

A structural member 61, which is shown in FIG. 6, has a shape of two helically rolled hoses the loops of which, arranged one after another in the longitudinal direction and abutting each other, are fixedly connected with each other axially. The inner space 52 of each hose forms a hollow chamber extending as a helix along the structural member 51. An elastic pressure disc 55 is provided between the front, in the setting direction, end face 58 of the drive piston 61 and the structural component 51.

Figure 7:
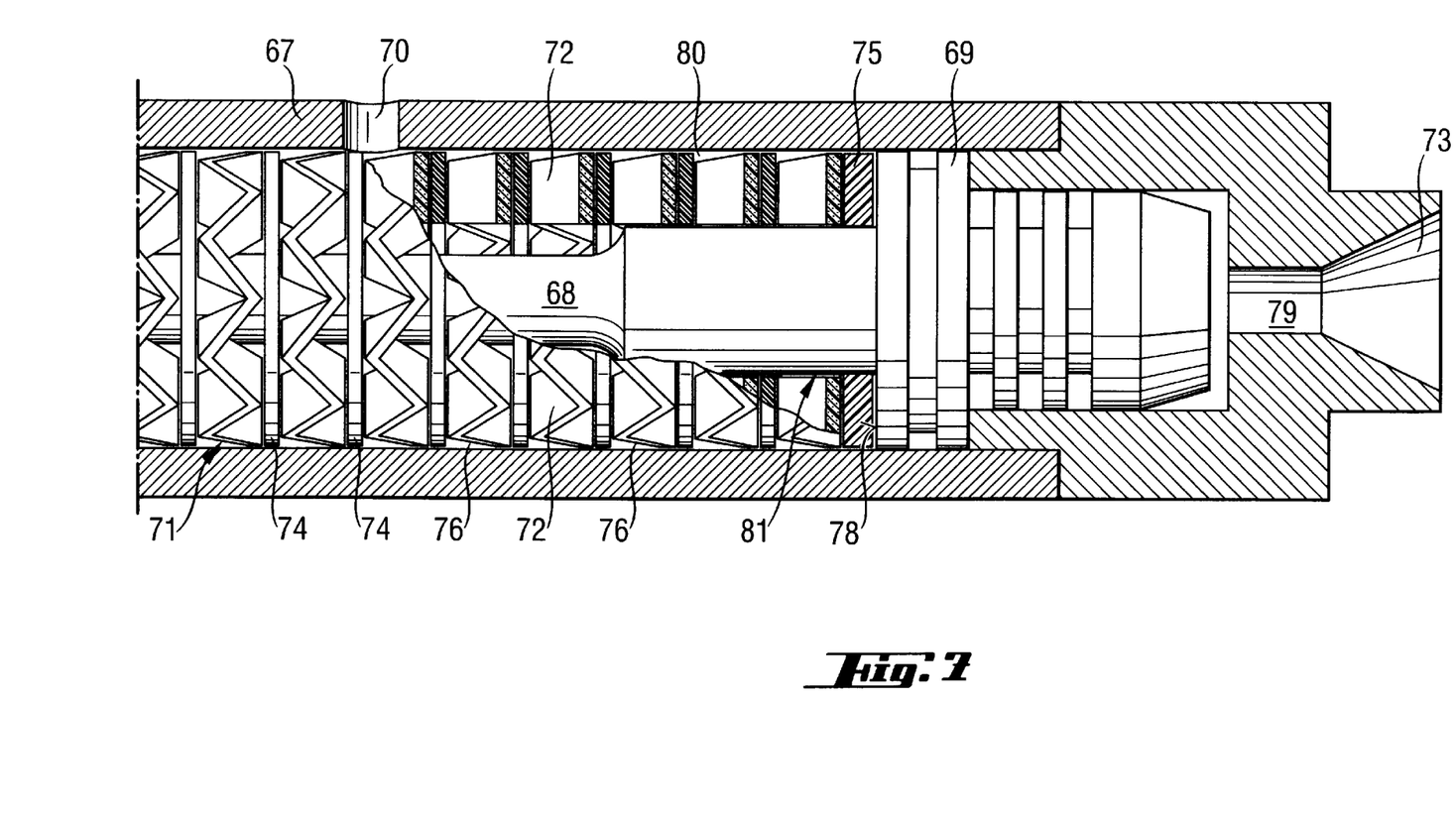
FIG. 7 shows a longitudinal cross-sectional view at an increased scale of a portion of a piston guide of a setting tool according to the present invention, with a still further embodiment of a structural member according to the invention.

The structural member 71, which is shown in FIG. 7, is formed of a plurality of separate elastic elements 76. A support disc 74 is provided between each two adjacent separate elastic elements 76. The support discs 74 insure a good side guidance of the separate elastic elements 76 in the piston guide 67 and prevent an undesirable form-looking engagement of a adjacent separate elastic elements 76 with each other. The separate elastic elements 76 have a shape of a corrugated disc. The outer diameter of the separate elastic elements 76 and the support discs corresponds essentially to the inner diameter of the piston guide 67. The inner diameter of both the separate elastic elements 76 and the support discs 74 corresponds essentially to the diameter of the stem 68. Both the separate elastic elements 76 and the supports 74 are formed of an elastic material. An elastic pressure disc 75 is provided between the front, in the setting direction, end face 78 of the drive piston 81 and the structural member 71.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A high pressure gas-operated setting tool, comprising a piston guide (7, 27, 47, 67); a driving piston (21, 41, 61, 81)

displaceable in the piston guide (7, 27, 47, 67) and having a stem (8, 28, 48, 68) and a head (9, 29, 49, 69); and a return member surrounding the stem (8, 28, 48, 68) and arranged between a stop (17), which is provided on the piston guide (7, 27, 47, 67) and faces in a direction opposite to a setting direction, and a front end face (18, 38, 58, 78) of the head (9, 29, 49, 69) facing in the setting direction, the return member being formed as a hollow cylindrical structural member of an elastic material and having a plurality of openings (12, 32, 34, 52, 72) which alternate, in a longitudinal direction, with layers of the elastic material, wherein the openings (32, 34) are formed as circumferential indentations provided, in the longitudinal direction, alternatively on an inner side and an outer side of the structural member (31).

2. A setting tool according to claim 1, wherein circumferential indentations extend along a helical line.

3. A setting tool according to claim 2, wherein a helical compression spring is associated with at least one indentation.

* * * * *